United States Patent [19]

Whitaker

[11] Patent Number: 4,490,056
[45] Date of Patent: Dec. 25, 1984

[54] COMBINATIONAL KEYBOARD UTILIZING SEQUENTIAL OPERATION OF KEYS

[76] Inventor: Ranald O. Whitaker, 4719 Squire Dr., Indianapolis, Ind. 46241

[21] Appl. No.: 421,462

[22] Filed: Sep. 22, 1982

[51] Int. Cl.³ .............................................. B41J 5/06
[52] U.S. Cl. ..................................... 400/100; 400/94; 400/482; 340/365 S
[58] Field of Search ................................. 400/91–94, 400/100–102, 477, 482; 340/365 R, 365 S, 365 E, 365 VL; 178/17 C; 235/145 R, 145 A, 145 B

[56] References Cited

U.S. PATENT DOCUMENTS 3,597,600  8/1971  Herendeen ................. 340/365 S X
3,892,915  7/1975  Budworth et al. ......... 340/365 S X
4,344,069  8/1982  Prame ............................. 400/100
4,360,892  11/1982  Endfield ..................... 340/365 S X Primary Examiner—Edgar S. Burr
Assistant Examiner—David A. Wiecking

[57] ABSTRACT

U.S. Pat. No. 4,067,431 discloses a combinational keyboard in which keys are operated in combinations much as a piano is played. A combination being those keys which are depressed between two periods in which no keys are depressed. Each combination generates a coded character. The present invention covers a modification of this keyboard system in which the character keyed depends upon the sequence in which the keys of the combination are operated as well as upon the combination itself. The preferred system permits the character set of a six-key one-handed keyboard to be expanded to 198 characters. Cost of the keyboard—about sixty grams of silver.

5 Claims, 6 Drawing Figures

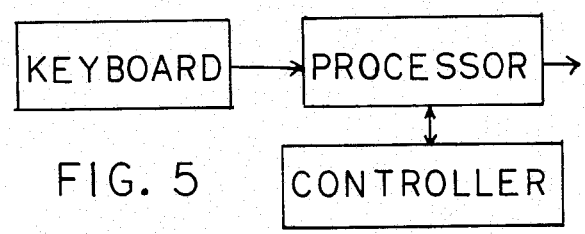

COMBINATIONAL KEYBOARD UTILIZING SEQUENTIAL OPERATION OF KEYS

SUMMARY

A one-handed combinational keyboard has six keys. It develops a character set of 63 characters. This is not enough. The object of the present invention is to expand this character set to 128 or more. This is accomplished by attaching significance to the order in which the keys are depressed and released. In the preferred embodiment a character set of 198 characters is provided by developing four subsets distinguished by:

A thumb key depressed first and a thumb key released last.

A thumb key depressed first and a finger key released last.

A finger key depressed first and a thumb key released last.

A finger key depressed first and a finger key released last.

THE DRAWINGS

FIG. 3 is a character set used with a conventional one-handed keyboard.

FIG. 4 is an expanded character set suggested for use with the sequential keyboard of the preferred embodiment.

FIG. 5 is a block diagram of the system.

BACKGROUND

Figure 1:
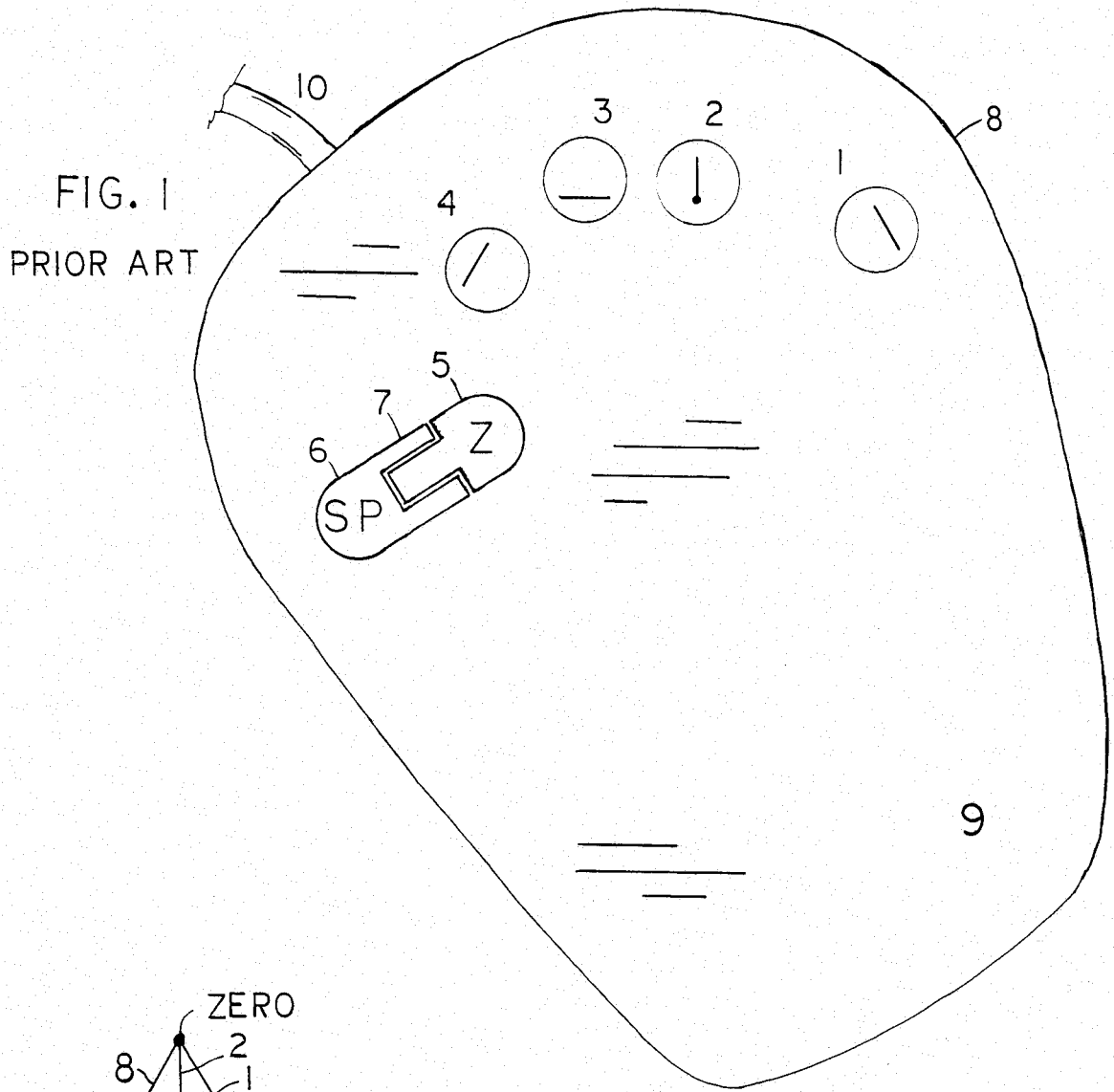
FIG. 1 is a plan view of a six-key one-handed keyboard of the type used in the preferred embodiment.

FIG. 1 is a plan view of a conventional six-key combinational keyboard. Keys 1, 2, 3, and 4 are positioned to fit naturally under the fingers of the right hand. Key 5 fits naturally under the thumb. Since the thumb moves laterally with ease, it can be moved to cover key 6. The interleaved tops of keys 5 and 6 permit the thumb to operate both keys when the thumb is moved to region 7.

No encoder is required for a combinational keyboard. The keys depressed in any combination generate a respective coded character. Six keys can generate a six bit character. A six bit code generally provides 64 characters. Hardly enough. Present technology uses a seven bit code providing 128 characters. If phonemes are to be represented, then an eight bit code becomes desirable.

Figure 2:
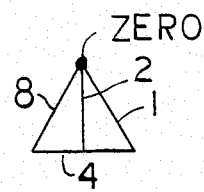
FIG. 2 shows several Computer Compatible Digits.

At upper left of FIG. 2 a "Computer Compatible Digit" is shown. Four lines plus a zero dot. Each line corresponds to a respective bit of the binary numbering system. Each element is weighted as indicated by the associated Arabic digit. This master digit represents the same number as does Arabic 15. The digits of the hexadecimal numbering system appear immediately below the master digit. Below that—1982.

The digit is computer compatible since there is a one-to-one correspondence between the elements of the digit and bits of the corresponding number representation used by the computer.

Advantages associated with the digit led to its adoption for use with the combinational keyboard.

Returning to FIG. 1, note the ╲, ⊥, —, and / on the finger keys. These keys may be operated in combination to generate digits of the hexadecimal (base-sixteen) numbering system. Addition of bit 5 would permit a base-thirty-two system. Bit 6—a base-sixty-four system. However, the base-16 system appears most appropriate for our advancing technology. Consequently key 5 is used to represent a zero and key 6 is used to represent letter "A"—when operated singly. Since key assignment is flexible when a computer is used, key 6 is often representative of a Space command when used singly.

A code for use with the keyboard is given in FIG. 3. The following are of interest.

Rows numbered down the left. Columns across the top.

The "ones" appearing in Row 1 indicate that the ╲ key is depressed in the respective combination.

For Row 2, the ⊥ key is depressed. For Row 3, the — key. Row 4, the / key.

Similarly for keys 5 and 6 appearing under "KEY" at left center of the chart. Their "ones" appear in their respective columns.

The key combination for any of the squares in the chart becomes the "ones" contained in the associated column and row.

The digits of the hexadecimal numbering system appear in the first row of the chart proper. Bits 5 and 6 are null. Consequently the keying of each digit develops the binary code for that digit. No encoding is required.

The zero dot appears at (6,0). It is represented by bit 5 being set.

This variation from the principle that each digit be represented by its binary equivalent is necessary since a null cannot be generated on a combinational keyboard. At least one key must always be depressed during a combination.

However, the null character is sometimes required. To meet this requirement, an "equivalent null" is provided at (6,15). Whenever the processors sees this character it substitutes the null.

The blanks appearing in Row 8 are user defined and are generally commands appropriate for the user system.

The number of special characters is inadequate. No lower case alphabet is provided. The number of punctuation marks is inadequate. The number of commands is inadequate.

THE PREFERRED EMBODIMENT

One-handed keying of an eight-bit code is desired. Lateral flexibility of the thumb permits a six-bit code. Lateral flexibility of the little finger would permit a seven-bit code. However, the operation soon becomes unwieldy and error prone.

But note that the keys of a combination cannot be depressed simultaneously. Nor can they be released simultaneously. There will always be a first key down. There will always be a last key up. So:

If a thumb key is depressed first, set the seventh bit.

If a thumb key is released last, set the eighth bit.

That gives us our eight-bit code. Cost is just a trifle more time in keying each character.

A suggested new code is given in FIG. 4. The following are of interest.

An indirect null is provided by the character in Row 8, Column 15.

Consider the blank appearing in Row 9, Column 0. No entry is possible.

Since a thumb key must necessarily come up last if none of the other keys is depressed. Same for the following spaces in Column 0.

A full eight-bit code would provide sixteen rows in the table. Three rows are missing. Each of the missing rows would have a thumb key either first down or first up when no thumb key is depressed. The rows are prohibited.

Four commands (Space, Backspace, New Line, and New Page) are given.
These may be augmented by others to meet the needs of particular applications.

A host of unassigned characters are available. A total of 198 characters are possible.

Physical System

A block diagram is shown in FIG. 5. The processor of the preferred system is an 8080 chip much used in the industry. The Controller is semiconductor memory using 21L02's. Microelectronic circuitry in this memory is arranged in accordance with a program. The Controller causes the Processor to monitor the keyboard, determine the boundaries of a combination, ascertain whether or not a thumb key is released last in a combination, ascertain whether or not a thumb key is depressed first, form the eight-bit character discussed previously, and make it available for external use. The modification made to the controller is electronic and not visible. In the preferred system the keys are single-pole, normally-open reed switches.

Preferred Algorithm

The character is developed in the E register of the 8080 processor.

The preferred algorithm for developing the character:

Look for the first bit of a combination. If it is a T bit (bit generated by one of the thumb keys), set (move to its "ON" state) the seventh bit in the E register.

Check the keyboard every millisecond. As succeeding bits come in, merge them into the E register.

Also, store each reading in the D register. This register will always hold the bit status for the most recent reading.

Look for all zeroes—indicating that all keys have been released. The D register should then hold the last bit to be released.

If D is a T bit, set (move to its "ON" state) the eighth bit of the E register.

The E register then holds the keyed character.

Flow Chart

Figure 6:
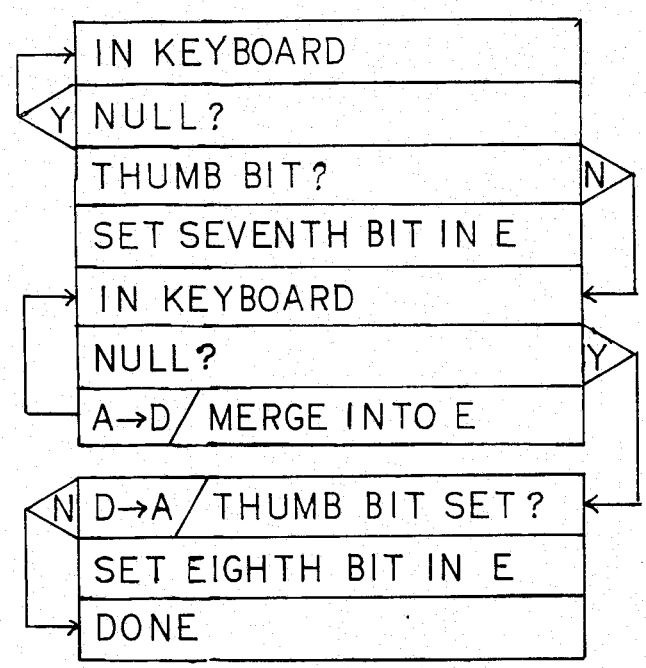
FIG. 6 is a flow diagram implementing the algorithm of the preferred embodiment.

See FIG. 6. Entries therein are explained as follows.
1. "In Keyboard". Bring in whatever is present in the keyboard. Do not wait for a flag signifying that a complete character is ready to be brought in.
2. Is it a null? If the operator has not begun to key the character, a null will be read. Go back and read again.
3. Note that the keyboard is being read as fast as the processor can read. Recall also that the operator intentionally keys a thumb key first or a finger key first. Consequently, the processor can ascertain if a thumb key is the first key to be depressed.
4. If the thumb key was first, then set the seventh bit in E. Recall that the character is to be assembled in E.
5. Entry to the second keyboard loop.
6. Look for a null indicating the operator has released the last key of the combination.
7. Not released yet? Then store the character just brought in in D. Then merge the character just brought in into E. This loop operates while the character is being keyed. It insures that all bits of the character merge into E.
8. Keying is complete. From D fetch the last bit to be released. Is it a thumb bit?
9. Yes. Then set the eighth bit in E.
10. The desired character is now in E.
The program is only 35 lines.

Discussion

The keyboard can be used to generate ASCII or EBCDIC. However, neither of these codes provides a hexadecimal numbering system. In fact, neither even represents the lower ten numbers by their proper binary equivalents. Being the products of standards committees their gross obsolescence is understandable. It was felt that it would be better to go to a system more nearly abreast of technology. However, the code suggested herein is undoubtedly not optimum. Persons having suggestions for improvement should forward those suggestions to the inventor. The introduction of this new keyboard marks a most appropriate time to be rid of the old and outmoded ASCII and EBCDIC. And to move forward with a computer compatible system of much greater utility to future generations.

While a righthand keyboard has been shown, a lefthand keyboard may as well be provided.

The computer compatible digit is in more elite circles referred to as a "formal digit". The first such digit was proposed by a gentleman in Prague in the fifties. Several persons in the U.S. have proposed such digits during the past two decades. The digit discussed herein has two distinct advantages over most others thus far proposed:

All digits are composed of contiguous elements.

All digits except two ($\perp$, $\wedge$) may be written without lifting the pen
from the paper.

The digits have been used in displays for several instruments. A time-of-day clock has been sold, but not widely. One printer has been built. One photoreader for reading computer programs into a computer. The digits are easily read by youngsters. But most adults find them most difficult or impossible to learn.

The sequential system of the preferred embodiment is most simple. The technique can be extended to provide a character set several orders of magnitude larger than that disclosed here. However, the set provided here appears sufficient for the present technology.

The combinational keyboard with sequential action should be slower than the straight combinational keyboard. And the latter should be slower than a conventional OPAT (one-peck-at-a-time) keyboard. However, Microswitch trained some operators on combinational (sometimes called "chord") keyboards and reported the combinational faster than an OPAT. This is doubted.

Where speed is not important, the combinational keyboard offers the following advantages.

The fingers are always on the correct keys. No need to bring the eyes from the copy to the keyboard.

One hand is always free for shuffling papers or holding a telephone.

The combinational keyboard can be built for some 60 grams of silver. An OPAT of comparable quality costs 600.

The combo keyboard is much smaller. Rendering it more appropriate for use with miniaturized data systems.

It is much easier to learn. Rendering it more appropriate for use by an engineer or a technician whose main job is not keying data.

There are no chips in the keyboard. Consequently there is no power requirement.

I claim:

1. A system for generating coded characters, said system having a keyboard, a controller, and a processor;

said keyboard having a set of keys adapted for being depressed in combinations, a combination being that subset of said keys each of which keys is depressed at some time during a combination period, a combination period being that period of time between two successive time intervals when no key is depressed;

each of said coded characters comprising a first set of bits and a second set of bits, all of said bits being normally in their "OFF" state;

each key of said set of keys having a respective bit in said first set of bits;

in response to depression of a subset of said keys, said system being adapted for causing the respective bit of each depressed key to assume its "ON" state; and in response to each possible sequence of key depression and release, said system being further adapted for causing a respective subset of said second set of bits to assume its "ON" state.

2. A system as in claim 1;

said controller being a memory modified in accordance with a control program; and said processor being operatively associated with said memory and adapted for receiving control signals from said memory.

3. A system as in claim 2;

said modified memory containing microelectronic circuitry for generating control signals causing said processor to;

a. receive key signals from said keyboard;
b. identify which keys are depressed at each of a series of discrete time intervals;
c. cause said respective bit of each depressed key to assume its "ON" state;
d. use said key signals to identify the boundaries of a combination period; and
e. for each possible sequence of depression and release of said keys, cause a respective subset of said second set of bits to assume its "ON" state.

4. A system as in claim 3;

said keyboard having four finger keys and at least one thumb key;

said microelectronic circuitry being adapted for generating control signals causing said processor to recognize four classes of said sequences:

a. one of said finger keys depressed first and one of said finger keys released last;
b. one of said thumb keys depressed first and one of said finger keys released last;
c. one of said finger keys depressed first and one of said thumb keys released last; and
d. one of said thumb keys depressed first and one of said thumb keys released last.

5. A system as in claim 3;

said keyboard having four finger keys and two thumb keys;

said coded character being eight bits in length;

each of the first six bits of said character being associated with a respective key of said set of keys;

said modified memory being adapted for causing said controller to:

a. change the seventh bit of said character to its "ON" state in response to a thumb key being depressed first in one of said combinations; and
b. change the eighth bit of said character to its "ON" state in response to a thumb key being released last in one of said combinations.

* * * * *